US011461590B2

(12) United States Patent
Marwah et al.

(10) Patent No.: US 11,461,590 B2
(45) Date of Patent: Oct. 4, 2022

(54) TRAIN A MACHINE LEARNING MODEL USING IP ADDRESSES AND CONNECTION CONTEXTS

(71) Applicant: MICRO FOCUS LLC, Sanford, NC (US)

(72) Inventors: Manish Marwah, Santa Clara, CA (US); Andrey Simanovsky, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 741 days.

(21) Appl. No.: 16/442,296

(22) Filed: Jun. 14, 2019

(65) Prior Publication Data

US 2020/0394463 A1    Dec. 17, 2020

(51) Int. Cl.
   *G06K 9/62*    (2022.01)
   *G06N 3/04*    (2006.01)
   *G06N 20/20*   (2019.01)
   *G06F 17/16*   (2006.01)

(52) U.S. Cl.
   CPC .......... *G06K 9/6257* (2013.01); *G06F 17/16* (2013.01); *G06N 3/04* (2013.01); *G06N 20/20* (2019.01)

(58) Field of Classification Search
   CPC ........ G06K 9/6257; G06N 20/20; G06N 3/04; G06F 17/16
   See application file for complete search history.

(56) References Cited

U.S. PATENT DOCUMENTS

| 9,037,464 | B1 | 5/2015 | Mikolov |
| 10,079,768 | B2 | 9/2018 | Kohout et al. |
| 2018/0205750 | A1 | 7/2018 | Kohout et al. |
| 2018/0219895 | A1 | 8/2018 | Silver et al. |
| 2018/0341839 | A1 | 11/2018 | Malak et al. |

OTHER PUBLICATIONS

Ring et al, "IP2Vec: Learning Similarities between IP Addresses," 2017, IEEE International Conference on Data Mining Workshops, pp. 657-666 (10 pages) (Year: 2017).*
Li, et al., "Deep Learning IP Network Representations", in Big-DAMA'18: Workshop on Big Data Analytics and Machine Learning for Data Communication Networks, Aug. 20, 2018, pp. 33-39.
Ring, et al., "Flow-based Network Traffic Generation using Generative Adversarial Networks", Computer Security, Oct. 19, 2018, 37 pages.

(Continued)

*Primary Examiner* — David F Dunphy (57) ABSTRACT

According to examples, an apparatus may include a processor and a non-transitory computer readable medium on which is stored machine readable instructions that may cause the processor to identify Internet protocol (IP) addresses and connection attributes associated with the IP addresses. The instructions may also cause the processor to train a machine learning model using the IP addresses as inputs to the machine learning model and connection contexts as outputs of the machine learning model. The machine learning model may learn a first weight matrix corresponding to the IP addresses and a second weight matrix corresponding to the connection contexts. In addition, the connection contexts may be concatenations of the connection attributes associated with a corresponding IP address.

20 Claims, 5 Drawing Sheets

(56) References Cited

OTHER PUBLICATIONS

Ring, et al., "IP2Vec: Learning Similarities Between IP Addresses", in IEEE International Conference on Data Mining Workshops, 2017, pp. 657-666.

Mikolov, et al., "Distributed Representations of Words and Phrases and their Compositionality", in Proceedings of the 26th International Conference on Neural Information Processing Systems—vol. 2, 2013, 9 pages. https://papers.nips.cc/paper/5021-distributed-representations-of-words-and-phrases-and-their-compositionality.pdf.

Wikipedia, "tf-idf", Retrieved from internet of Feb. 19, 2019; 7 pages. https://en.wikipedia.org/wiki/Tf-idf.

* cited by examiner

DETERMINE A WEIGHTING FACTOR FOR EACH OF THE CONNECTION CONTEXTS ASSOCIATED WITH THE IP ADDRESSES
502

APPLY THE WEIGHTING FACTOR DURING TRAINING OF THE MACHINE LEARNING MODEL, WHEREIN THE WEIGHTING FACTOR FOR A PARTICULAR CONNECTION CONTEXT VARIES PROPORTIONALLY TO A FREQUENCY IN WHICH THE PARTICULAR CONNECTION CONTEXT IS ASSOCIATED WITH A PARTICULAR IP ADDRESS, AND VARIES INVERSELY TO A NUMBER OF IP ADDRESSES IN A NETWORK DATA LOG ASSOCIATED WITH THE PARTICULAR CONNECTION CONTEXT
504

CHANGE A NUMBER OF TRAINING POINTS FOR THE CONNECTION CONTEXT BASED ON THE WEIGHTING FACTOR DURING TRAINING OF THE MACHINE LEARNING MODEL
506

TRAIN A MACHINE LEARNING MODEL USING IP ADDRESSES AND CONNECTION CONTEXTS

BACKGROUND

Network data may be analyzed to detect network behavior of devices on a network. For example, the network data may include IP addresses of hosts and associated connection attributes associated with the IP addresses. This information may be used as features in machine learning models to obtain information regarding a network.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Network data (e.g., network traffic data) may be used to obtain network traffic data and machine learning (ML) techniques may be used to analyze the network traffic data. For example, ML techniques may be used in user and behavioral analytics, and network traffic data may routinely be used for learning and inference in these models. An attribute in network traffic data is an IP address, which is often used as a feature in ML techniques. IPv4 addresses are represented as 32-bit integers and IPv6 addresses are represented as 64-bit integers that relate to the topology of the network where they are hosted. A frequent operation involved in ML techniques is computing distances between feature vectors (e.g., in clustering, k-nearest neighbors, anomaly detection methods). However, computing distances between raw IP addresses may not be very helpful because in many cases they do not reflect traffic pattern behaviors of hosts associated with these IP addresses.

Disclosed herein are apparatuses and methods for learning representations (or equivalently, embeddings) of network data including IP addresses that may capture information regarding network behavior of hosts corresponding to the IP addresses. According to examples, vector embeddings may be learned from IP addresses, where the embedding space captures the network traffic characteristics. The learned representations (e.g., vector embeddings) may be used as features in machine learning models, for example, in clustering, k-nearest neighbors, anomaly detection methods, or the like. According to examples, the embeddings may be learned for two entities: IP addresses and connection contexts. According to examples, the embeddings for both IP addresses and connection contexts may be learned jointly in the machine learning model.

A processor may identify Internet protocol (IP) addresses and connection attributes associated with IP addresses. The connection attributes associated with the IP addresses may include a source port, a destination IP address, a destination port, a protocol, a TCP flag, a timestamp, a number of bytes, a number of packets, or the like. The processor may train a machine learning model using the IP addresses as inputs to the machine learning model and connection contexts as outputs of the machine learning model. The machine learning model may learn a first weight matrix corresponding to the IP addresses and a second weight matrix corresponding to the connection contexts. The connection contexts may be concatenations of the connection attributes associated with a corresponding IP address.

According to examples, the embeddings in the machine learning model may be initialized using the IP addresses, as opposed to being initialized randomly, which may provide more meaningful results in cases where a small amount of training data is available. According to examples, a context-specific weight term may be incorporated during training using, for example, term frequency-inverse document frequency (TD-IDF), or the like. Specifically, contexts that are more useful in characterizing an IP address may be given higher weights when training the machine learning model.

A technical problem associated with representations of IP addresses used by machine learning methods may be that the representations do not capture information regarding network behavior of hosts with these IP addresses. For example, the representations used may be based on network topology, and may only provide distance metrics computed between IP addresses. As such, these representations of IP addresses may not capture information regarding network behavior of hosts with these IP addresses.

Through implementation of the apparatuses and methods disclosed herein, representations of IP addresses and connection contexts associated with the IP addresses may capture information regarding network behavior of hosts with the IP addresses. By embedding IP addresses, more accurate features that represent network behavior of hosts associated with the IP addresses may be obtained. Using such features as inputs to other machine learning models, characteristics or events of a network, such as threats, anomalies in network traffic, or the like, may more accurately and efficiently be identified. For example, vector representations of IP addresses extracted from parameters of the machine learning model may be more representative of network behavior of hosts with the IP addresses, and hence may be better features for input to other machine learning models. A technical solution to the technical problem discussed above may thus be that features of the present disclosure may enhance, for example, monitoring of devices and networks.

Figure 1:
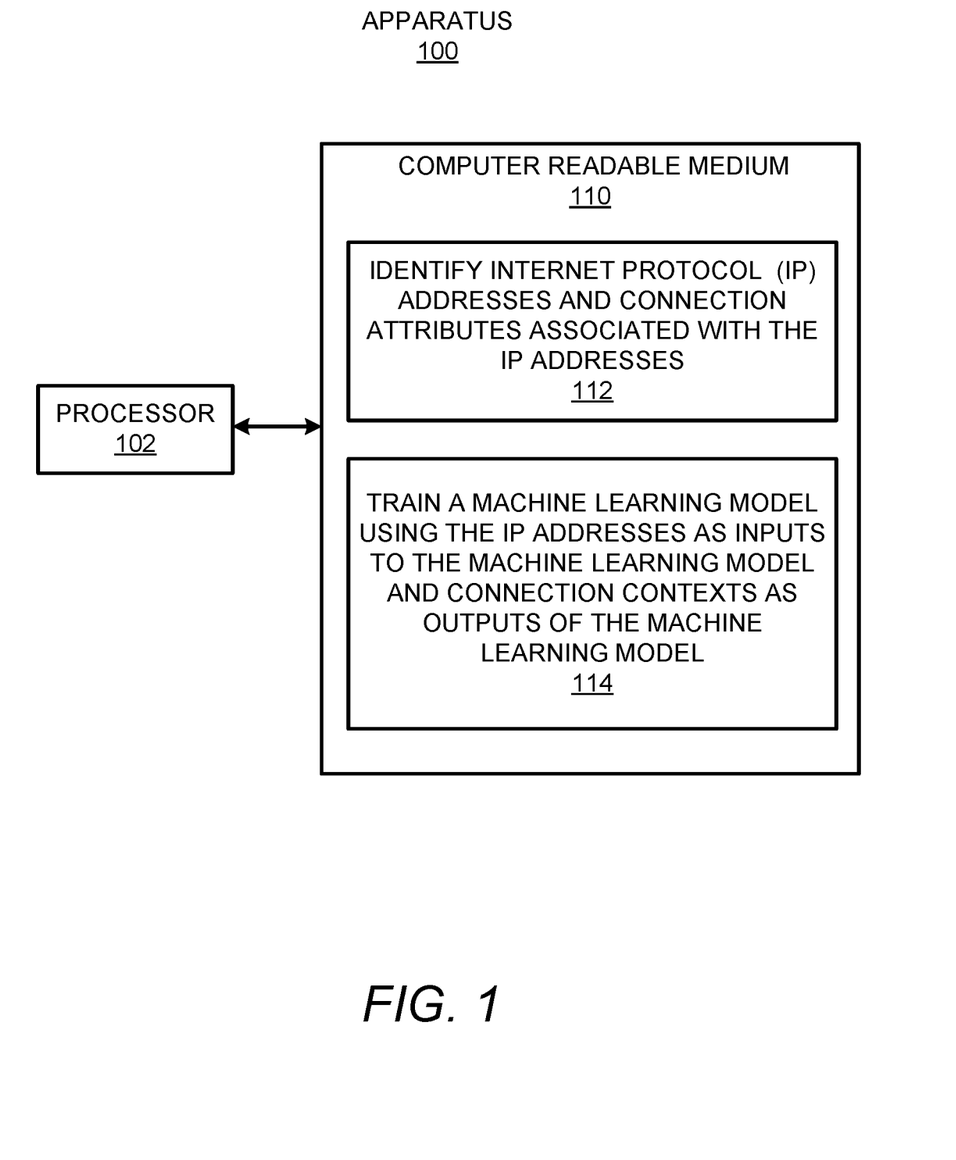
FIG. 1 depicts a block diagram of an example apparatus that may train a machine learning model using IP addresses as inputs and connection contexts as outputs.
Figure 2:
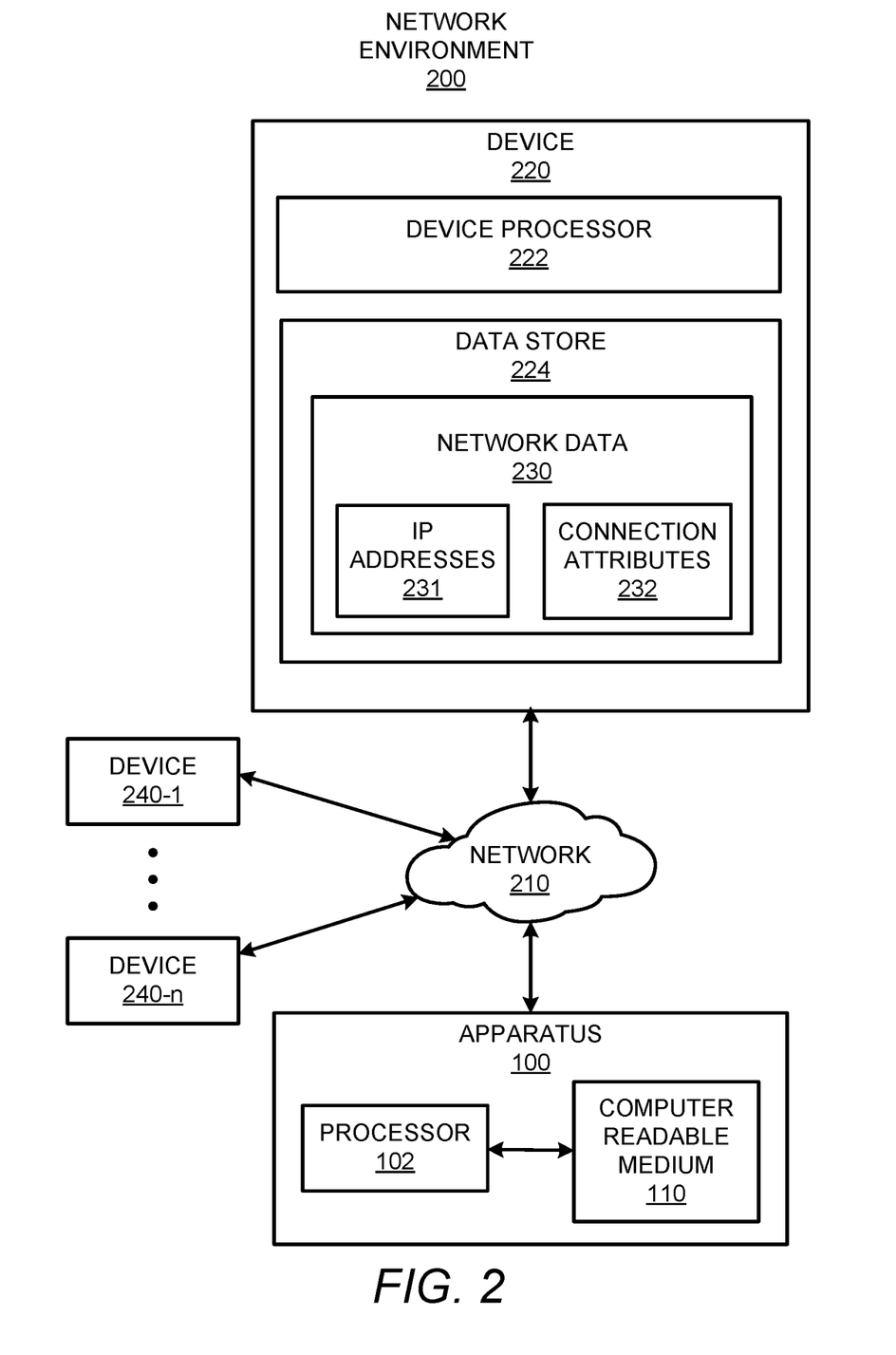
FIG. 2 depicts a block diagram of an example network environment in which the apparatus depicted in FIG. 1 may be implemented to train a machine learning model using IP addresses as inputs and connection contexts as outputs.
Figure 3:
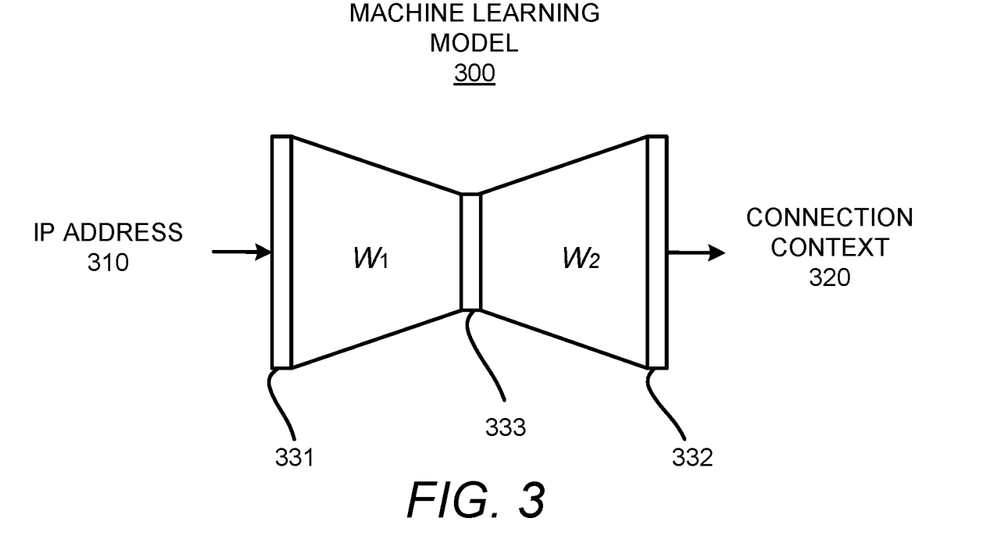
FIG. 3 depicts a block diagram of an example machine learning model.

Reference is first made to FIGS. 1-3. FIG. 1 shows a block diagram of an example apparatus 100 that may identify IP addresses 231 and connection attributes 232, and train a machine learning model 300 using the IP addresses 231 and connection attributes 232. FIG. 2 shows a block diagram of an example network environment 200 in which the apparatus 100 depicted in FIG. 1 may be implemented to identify the IP addresses 231 and the connection attributes 232, and train the machine learning model 300. It should be understood that the apparatus 100 depicted in FIG. 1, the network environment 200 depicted in FIG. 2, and/or the machine learning model 300 may include additional features and that some of the features described herein may be removed and/or modified without departing from the scope of the apparatus 100, the network environment 200, and/or the machine learning model 300.

The apparatus 100 may be a server, a node in a network (such as a data center), a personal computer, a laptop computer, a tablet computer, a smartphone, a network gateway, a network router, an Internet of Things (IoT) device, and/or the like. As depicted in FIG. 2, the apparatus 100 may be part of a network environment 200 in which the apparatus 100 may communicate with devices 220 and 240-1 to 240-$n$ via a network 210. The devices 220 and 240-1 to 240-$n$ may each be a personal computer, a laptop computer, a tablet computer, a smartphone, a network gateway, a network router, a server, or the like. The network 210 may be a local area network, a direct connection, a wide area network, the Internet, or the like. In instances in which the network 210 is a local area network, the network 210 may be a wireless fidelity network, a Bluetooth™ connection, or the like.

The apparatus 100 may access a network data 230 stored on the data store 224. The network data 230 may be a network data log that includes information related to network communication between devices 240-1 to 240-$n$. The network data log may include IP addresses 231 and connection attributes 232 associated with the IP addresses 231. In some examples, the network data logs may be NetFlow™ logs, or the like, that contain attributes for each flow. The network data logs may include attributes for each flow such as source IP address, source port, destination IP address, destination port, protocol, TCP flags, timestamp, number of bytes, number of packets, or the like. In some examples, the network data log may be stored locally on apparatus 100.

As depicted in FIGS. 1 and 2, the apparatus 100 may include a processor 102 and a computer readable medium 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single machine readable medium 110 may be understood to additionally or alternatively pertain to multiple processors 102 and multiple computer readable mediums 110.

The computer readable medium 110 may be, for example, a Random Access memory (RAM), an Electrically Erasable Programmable Read-Only Memory (EEPROM), a storage device, an optical disc, or the like. The computer readable medium 110, which may also be referred to as a machine readable storage medium, may be a non-transitory computer readable storage medium, where the term "non-transitory" does not encompass transitory propagating signals. In any regard, the computer readable medium 110 may have stored thereon machine readable instructions 112-114.

The processor 102 may fetch, decode, and execute the instructions 112 to identify IP addresses 231 and connection attributes 232 (or flow attributes) associated with the IP addresses 231. As previously described, connection attributes 232 for each of the IP addresses 231 may include at least one of a source port, a destination IP address, a destination port, a protocol, a TCP flag, a timestamp, a number of bytes, a number of packets, or the like.

Referring to FIGS. 1 and 3, the processor 102 may fetch, decode, and execute the instructions 114 to train a machine learning model 300 using IP addresses 310 as inputs to the machine learning model 300 and connection contexts 320 as outputs of the machine learning model 300. The IP addresses 310 may be a vector representation of IP addresses 231 for input to the machine learning model 300.

For example, the machine learning model 300 may be trained to predict a connection context 320 given an IP address 310. The connection context 320 may be defined by properties (or features or attributes 232) of the connection of a host associated with the IP address 310. For example, the connection context 320 may be defined by a peer device 240-2 IP address (e.g., destination address) to which a device 240-1 connects. In another example, the connection context 320 may be defined by a plurality of fields from the connection state such as port numbers, protocol, number of bytes transferred, or the like.

Based on network data 230, each IP address 310 may be described in terms of associated connection contexts 320. A context may pertain to each flow (connection), or for a window of time. Thus, each IP address may be described in terms of a sequence of contexts.

$$IP_1: \{c_{11}, c_{12}, \ldots, c_{1n_1}\}$$

$$IP_i: \{c_{i1}, c_{i2}, \ldots, c_{in_i}\}) \qquad \text{Equation 1}$$

where $c_{ij}$ is the jth context of the $IP_i$ and $n_i$ is the number of contexts associated with $IP_i$.

Referring to FIG. 3, the machine learning model 300 may include an input layer 331, an output layer 332, and a hidden layer 333. To learn the embedding, the processor 102 may represent each IP address 310 as a one hot vector. In other words, IP address 310 may be a one hot vector representation of IP address 231. Similarly, each connection context 320 may be represented by a one hot vector. In an example, the machine learning model 300 may be a neural network model with IP addresses 310 as inputs and contexts 320 as outputs. A training data set may include IP address and connection context pairs. The vector representations of the IP addresses 231 may be extracted from the parameters of the model 300.

The processor 102 may fetch, decode, and execute the instructions 112 to train the machine learning model 300 to learn a first weight matrix $W_1$ (first embedding or first embedded vectors) corresponding to the IP addresses 310 and a second weight matrix $W_2$ (second embedding or second embedded vectors) corresponding to the connection contexts 320. The connection contexts 320 may be concatenations of the connection attributes associated with a corresponding IP address 310. For example, when a connection context 320 is associated with a plurality of connection attributes 232 (e.g., destination IP address, destination port, a protocol, etc.), the connection context 320 may represent a concatenation of each of the associated connection attributes 232 for a given IP address 310.

The processor 102 may fetch, decode, and execute the instructions 112 to learn the first weight matrix $W_1$ and the second weight matrix $W_2$ jointly. Referring again to FIG. 3, the model input (IP addresses 310) may be an IP address vector (one hot vector encoding), $x \in R^{|P|}$, the model output (connection contexts 320) may be a connection context vector (one-hot vector encoding), $y \in R^{|c|}$, where the model parameters are parameters: $W_1 \in |IP| \times d$ and $W_2 \in x|C|$, where |IP| is the total number of IP's in the model and |C| is the total number of contexts in the model.

In the model 300 as depicted in FIG. 3, d may be a dimension of the embedded vectors. The embeddings for IP addresses 310 and contexts 320 may be learned jointly using the above architecture using gradient descent, or the like. The output layer 332 may be a softmax with cross-entropy loss function, or the like.

In some examples, the first weight matrix Wi may include an embedding vector for each of the IP addresses 310 that includes a plurality of first weights in an embedding space, and the second weight matrix $W_2$ may include an embedding vector for each of the connection contexts 320 that includes a plurality of second weights in the embedding space. In some examples, each row of the first weight matrix Wi may be an embedding vector corresponding to the IP addresses 310, and each column of the second weight matrix $W_2$ may be an embedding vector corresponding to the connection contexts 320.

For example, after the machine learning model 300 is trained, the rows of matrix, $W_1$, may contain d-dimensional vectors for each IP address 310. Similarly, the columns of matrix, $W_2$, may contain d-dimensional vectors for each connection context 320. In an example, the dimension d represents a number of hidden neurons in the hidden layer 333 of the machine learning model 300. A size of dimension d of the hidden layer 333 may be smaller than a dimension of the vector representation of the IP addresses 310 or connection contexts 320.

In some examples, the network data may include very large numbers of IP addresses 231 and connections. The number of IP addresses 231 and connections in data collected over time may be very large, resulting in a context space that is too large to be efficiently processed. To limit the number of connection contexts, |C|, or IP addresses, |IP|, either or both may be reduced, for example, using hashing functions to hash into a fixed number of bits, by using various candidate sampling methods, or another appropriate type of algorithm to reduce the size of the embedded space.

In some examples, the processor 102 may fetch, decode, and execute the instructions 112 to initialize the first weight matrix $W_1$ in the machine learning model 300 using the identified IP addresses and initialize the second weight matrix $W_2$ in the machine learning model 300 using the connection contexts. The first weight matrix $W_1$ and the second weight matrix $W_2$ may be given values derived from the identified IP addresses.

For example, if a size of the embedding is 32-bit, an IPv4 IP address may directly be used to initialize the embedding. However, the initialization of the first weight matrix $W_1$ and the second weight matrix $W_2$ is not limited by a size of the IP address. In case a larger embedding size is used, a subset of the embedding vector (e.g. 32 bits) may be initialized by the IP address. In case a smaller embedding size is used, the corresponding high-order bits of the IPv4 address may be used to initialize the embedding vector while remaining bits are unused. In another example, a similar method may be used in case of IPv6 addresses. Initializing the embedding vector with the IP address may, in case very few training examples are available for a specific IP address, enable the embedding to default to a vector derived from the IP address instead of a randomly assigned vector.

In some examples, the processor 102 may fetch, decode, and execute the instructions 114 to determine a weighting factor for each of the connection contexts 320 associated with the IP addresses 310. The determined weighting factor may be associated with an identified importance of a particular context relative to other contexts.

For example, all connection contexts associated with an IP address may not be equally useful in characterizing that IP address. In fact, some frequently occurring contexts may not provide any additional insight regarding an IP address if those contexts occur for a majority of IP addresses. To address this, a context-specific weight term may be incorporated in a loss function while training the machine learning model 300. This term may be computed for each context and may incorporate a context frequency associated with an IP address and a number of IP addresses with which each context occurs.

In some examples, the weighting factor for a particular connection context 320 may vary proportionally to a frequency in which the particular connection context 320 is associated with a particular IP address 310. The weighting factor for a particular connection context 320 may vary inversely to a number of IP addresses 310 in a network data log associated with the particular connection context 320. In some examples, the weighting factor WF may be defined as:

$$WF(i, j) = |C_{i,j}| * \log \frac{|IP|}{|IP_j|} \qquad \text{Equation 2}$$

where i refers to IP, and j to connection context, $|c_{i,j}|$ is the frequency of jth context related ith IP, |IP| is the total number of IPs, and $|IP_j|$ is the number of IPs containing jth context.

In some examples, the processor 102 may fetch, decode, and execute the instructions 114 to determine a weighting factor for each of the connection contexts 320 associated with the IP addresses 310, and may apply the weighting factor during training of the machine learning model 300. In some examples, the processor may change a number of training points for the connection contexts 320 based on the weighting factor during training of the machine learning model. In some examples, the processor 102 may determine an error in the machine learning model 300 and may change at least one of the plurality of first weights or the plurality of second weights based on the determined error.

Referring again to FIGS. 1 and 3, a simplified example of training the machine learning model is provided to facilitate description of the features described above. In this example, the machine learning model 300 is trained using a connection context 320 defined by one flow attribute, e.g., external IP addresses. Here, the input to the machine learning model 300 may be the IP addresses 310 and the output may be the external IP addresses. Here, the processor 102 may fetch, decode, and execute the instructions 114 to train the machine learning model 300 using IP addresses 310 as inputs to the machine learning model 300 and the external IP addresses for connection contexts 320 as outputs of the machine learning model 300.

In this example, the context may only include the external IP address. For example, other information such as port number, protocol, bytes, etc., may be ignored.

Referring to Table 1, the training data set may include 5 data points, 4 unique internal IP addresses 231, and 3 unique external IP addresses 232. While the number of IP addresses have been limited in this example for ease of description, it should be understood that any number of IP addresses may be included.

TABLE 1

|   | Source IP | Destination IP | X | Y |
|---|-----------|----------------|------|-----|
| 1 | 192.168.100.2 | 10.12.200.5 | 0001 | 001 |
| 2 | 10.12.100.20 | 192.168.100.4 | 0010 | 010 |
| 3 | 192.168.100.2 | 15.10.2.2 | 0001 | 100 |
| 4 | 10.12.200.5 | 172.16.200.10 | 0100 | 001 |
| 5 | 172.16.100.6 | 15.10.2.2 | 1000 | 100 |

In Table 1, 192.168.* and 172.16* are the internal IP addresses, and the rest are external IP addresses. The processor 102 may fetch, decode, and execute the instructions 114 to learn vector representations of the internal IP addresses. The external IP addresses may be a part of the context 320. Data points 1, 3, and 5 may correspond to external traffic (source IP is within an enterprise, destination IP is external), while data points 2 and 4 may correspond to internal traffic (source IP is outside the enterprise, destination is internal). X may be derived from the internal IP addresses, while Y may be derived from the external IP addresses. In some examples, a filter may be applied to the data set used for training. For example, only data corresponding to the outgoing traffic may be selected, or only data corresponding to a particular protocol, or a particular set of port numbers may be selected.

In this example, dimension d is 4. While in this example, dimension d is 4 and the number of IP addresses is 5, it should be understood that dimension d may be significantly smaller than the number of IP addresses.

Matrix $W_1$ may be initialized using the IP addresses rather than being randomly initialized:

$$W_1 = \begin{bmatrix} 0.192 & 0.168 & 0.100 & 0.002 \\ 0.192 & 0.168 & 0.100 & 0.004 \\ 0.172 & 0.016 & 0.200 & 0.010 \\ 0.172 & 0.016 & 0.100 & 0.006 \end{bmatrix} \quad \text{Equation 3}$$

Each row of matrix $W_1$ may be initialized with the corresponding IP address. Here, the IP octets may be divided by 1000 to obtain appropriate weights. It should be understood that other transformations may also be suitable to derive the initial values of the weights from the IP addresses.

Matrix $W_2$ may be initialized based on context IP addresses. The context embedded vectors may be initialized using context IP addresses similar to $W_1$:

$$W_2 = \begin{bmatrix} 0.010 & 0.010 & 0.015 \\ 0.012 & 0.012 & 0.010 \\ 0.200 & 0.100 & 0.002 \\ 0.005 & 0.020 & 0.002 \end{bmatrix} \quad \text{Equation 4}$$

In this example, the first training point is:

$$X^T = [0\ 0\ 0\ 1] \quad \text{Equation 5}$$

$$Y^T = [0\ 0\ 1] \quad \text{Equation 6}$$

To compute Y from X, a forward pass is performed through the neural network:

$$Z^T = X^T \cdot W_1 \cdot W_2 \quad \text{Equation 7}$$

$X^T$: $1 \times |IP|$, here $1 \times 4$;
$W_1$: $|IP| \times d$, here $4 \times 4$;
$W_2$: $d \times |C|$, here $4 \times 3$;
$Z^T$: $1 \times |C|$, here $1 \times 3$.

In this example, $$Z^T = [0.02194\ 0.0120\ 0.0029] \quad \text{Equation 8}$$

The predicted output, $\hat{Y}$, may be the softmax of Z:

$$\hat{Y} = \frac{e^Z}{\sum e^Z} \quad \text{Equation 9}$$

Here, $$\hat{Y}^T = [0.3365\ 0.3332\ 0.3302] \quad \text{Equation 10}$$

The real output is:

$$Y^T = [0\ 0\ 1] \quad \text{Equation 11}$$

The cross-entropy loss function may be:

$$L = -\Sigma_i y_i \cdot \log(\hat{y}_i) \quad \text{Equation 12}$$

where, $$y_i \in Y,\ \hat{y}_i \in \hat{Y} \quad \text{Equation 13}$$

Here, $$L = 1.107999 \quad \text{Equation 14}$$

At this point, backpropagation may be used to compute the error derivatives with respect to a loss function (dL/dw) Then gradient descent can be used to update all the weights $W_1$ and $W_2$. For example, each weight may be updated by the following:

$$\Delta w_i = -\alpha \cdot \frac{\partial L}{\partial w_i} \quad \text{Equation 15}$$

where, $\alpha$ is a learning rate. In some examples, instead of gradient descent, stochastic gradient descent or any of its variants including those that use a momentum term in the update equation may be used. It should be appreciated that other types of algorithms may be used depending on the application.

The update of $W_1$ and $W_2$ ends one iteration of the learning algorithm. This process may be repeated until the loss is minimized, and the final W matrices provide the embedded vectors for internal IP addresses and contexts.

Referring again to FIGS. 1 and 3, in another example, the input to the machine learning model 300 may be the IP addresses 310 while the output may be a connection context 320 that includes a destination IP address, a source port, a destination port, and a number of bytes. Here, the processor 102 may fetch, decode, and execute the instructions 114 to train the machine learning model 300 using IP addresses 310 as inputs to the machine learning model 300 and the destination IP address, the source port, the destination port, and the number of bytes as a connection context 320 as outputs of the machine learning model 300.

TABLE 2

| Source IP | Destination IP | Source Port | Destination Port | #Bytes |
|---|---|---|---|---|
| 192.168.100.2 | 10.12.200.5 | 32100 | 80 | 1200 |
| 10.12.100.20 | 192.168.100.4 | 20400 | 23 | 500 |
| 192.168.100.2 | 15.10.2.2 | 12000 | 80 | 2048 |
| 10.12.200.5 | 172.16.200.10 | 7900 | 443 | 800 |
| 172.16.100.6 | 15.10.2.2 | 8800 | 443 | 550 |

Referring to Table 2, this example is similar to the previous example described with reference to Table 1, except that the connection context 320 in this case includes multiple connection attributes 232 including, for example, the external IP address, the source port number, destination port number, and number of bytes. The connection contexts 320 may be created by combining together the connection attributes 232, e.g., by concatenating these fields. In case a large number of contexts 320 exists due to large amounts of data collected in the data logs, the data may be hashed to reduce the number of contexts. For example, in the five data points illustrated in Table 2, each would be a different context, that is, five contexts in all.

There are multiple methods of deriving a context from these fields. One method may be to concatenate the fields. For example, referring to Table 2, assuming that the external IP, the source port, the destination port, and the number of bytes are represented by 4 bytes, 2 bytes, 2 bytes and 2 bytes, respectively, a context may include a 10 byte or 80 bit long field. Since 80 bits may result in a large number of contexts (e.g., $2^{80}$), the context space may be reduced by hashing the 80 bit field to a 16 bit field, in which case the maximum number of contexts may be reduced to be $2^{16}$ or about 64K.

According to examples, the size of the context space may be reduced using candidate sampling methods, in lieu of or in addition to the hashing function. For example, various types of candidate sampling algorithms may be used such as noise contrastive estimation (NCE), negative sampling, sampled logistic, full logistic, full softmax, sampled softmax, context-specific sampling, batchwise sampling, or another appropriate type of algorithm based on the application.

Once the contexts are defined, the remaining process may be the same as that previously described in the example with reference to Table 1, and therefore duplicative description of the same features have been omitted.

Instead of the machine readable instructions 112 and 114, the apparatus 100 may include hardware logic blocks that may perform functions similar to the instructions 112 and 114. In other examples, the apparatus 100 may include a combination of instructions and hardware logic blocks to implement or execute functions corresponding to the instructions 112 and 114. In any of these examples, the processor 102 may implement the hardware logic blocks and/or execute the instructions 112 and 114. As discussed herein, the apparatus 100 may also include additional instructions and/or hardware logic blocks such that the processor 102 may execute operations in addition to or in place of those discussed above with respect to FIG. 1.

Figure 4:
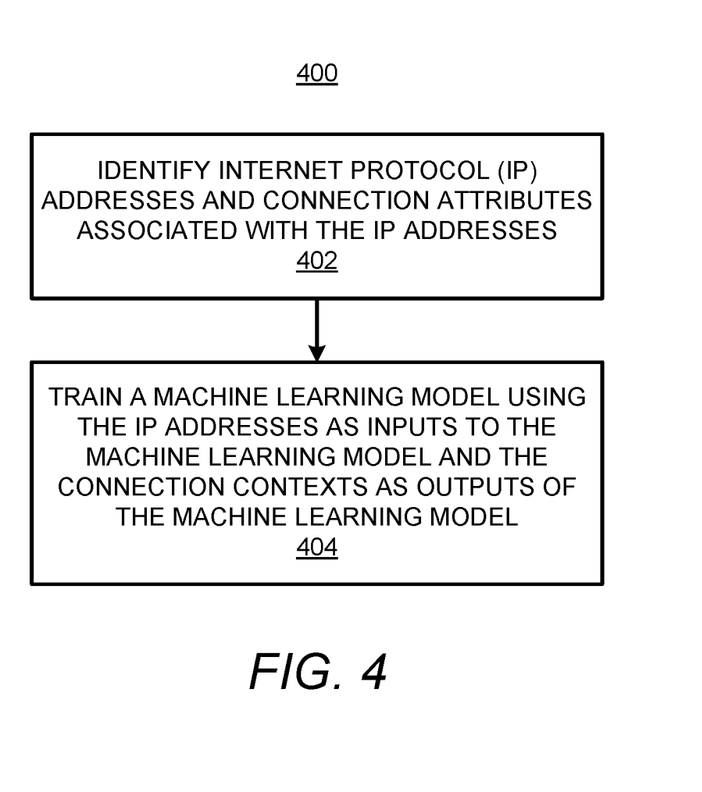
FIG. 4 depicts a flow diagram of an example method for training a machine learning model using IP addresses as inputs and connection contexts as outputs in the machine learning model.
Figure 5:
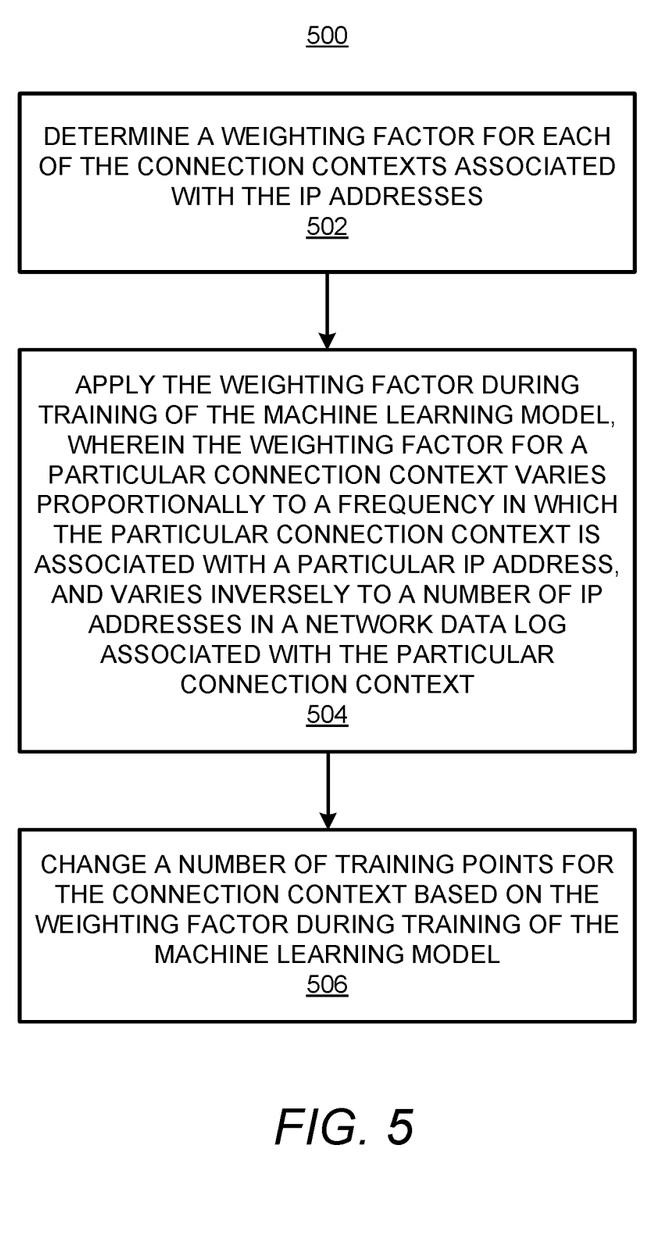
FIG. 5 depicts a flow diagram of an example method for training a machine learning model based on a weighting factor for connection contexts associated with IP addresses.

Various manners in which the processor 102 of the apparatus 100 may operate are discussed in greater detail with respect to the methods 400 and 500 respectively depicted in FIGS. 4 and 5. Particularly, FIG. 4 depicts a flow diagram of an example method 400 for training a machine learning model using IP addresses as inputs and connection contexts as outputs in the machine learning model. In addition, FIG. 5 depicts a flow diagram of an example method for training a machine learning model based on a weighting factor for connection contexts associated with IP addresses. It should be understood that the methods 400 and 500 depicted in FIGS. 4 and 5 may include additional operations and that some of the operations described therein may be removed and/or modified without departing from the scopes of the methods 400 and 500. The descriptions of the methods 400 and 500 are made with reference to the features depicted in FIGS. 1-3 for purposes of illustration.

At block 402, the processor 102 may identify Internet protocol (IP) addresses and connection attributes 232 associated with the IP addresses 231. The processor 102 may identify the IP addresses 231 and connection attributes 232 in any of the manners discussed above.

At block 404, the processor 102 may train a machine learning model 300 using IP addresses as inputs to the machine learning model 300 and the connection attributes as outputs of the machine learning model. The machine learning model 300 may learn a first embedding corresponding to the IP addresses and a second embedding corresponding to the connection attributes. The connection attributes may be concatenations of the connection attributes associated with a corresponding IP address. As discussed herein, the first embedding for the IP addresses and the second embedding for the connection attributes may be learned jointly.

Turning now to FIG. 5, at block 502, the processor 102 may determine a weighting factor for each of the connection attributes associated with the IP addresses.

At block 504, the processor 102 may apply the weighting factor during training of the machine learning model. In examples, the weighting factor for a particular connection attribute may vary proportionally to a frequency in which the particular connection attribute is associated with a particular IP address, and may vary inversely to a number of IP addresses in a network data log associated with the particular connection attribute.

At block 506, the processor may change a number of training points for the connection attributes based on the weighting factor during training of the machine learning model.

According to examples, the processor may initialize a first weight matrix of the first embedding using the identified IP addresses and initialize a second weight matrix of the second embedding using the connection attributes.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
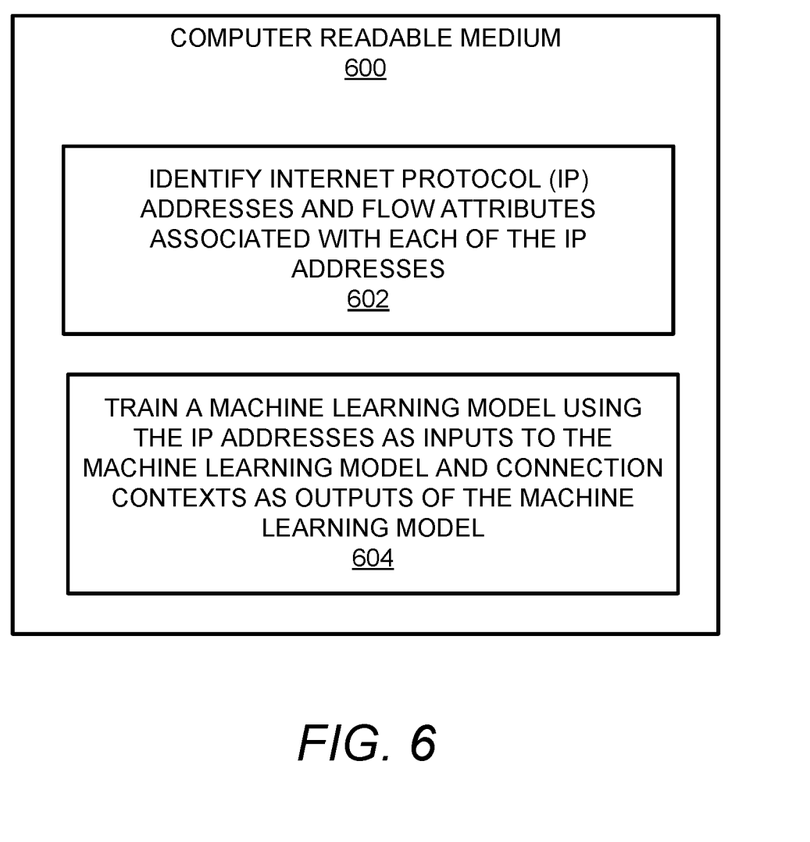
FIG. 6 depicts a block diagram of an example computer readable medium that has stored thereon machine readable instructions that when executed by a processor, may cause the processor to train a machine learning model using IP addresses as inputs to the machine learning model and connection contexts as outputs of the machine learning model.

Turning now to FIG. 6, there is depicted a block diagram of an example computer readable medium 600 that has stored thereon machine readable instructions that when executed by a processor, may cause the processor to train a machine learning model using IP addresses as inputs to the machine learning model and connection contexts as outputs of the machine learning model. It should be understood that the computer readable medium 600 depicted in FIG. 6 may include additional instructions and that some of the instructions described herein may be removed and/or modified without departing from the scope of the computer readable medium 600 disclosed herein. The computer readable medium 600 may be a non-transitory computer readable medium. The term "non-transitory" does not encompass transitory propagating signals.

The computer readable medium 600 may have stored thereon machine readable instructions 602-604 that a processor, such as the processor 102 depicted in FIGS. 1 and 2, may execute. The computer readable medium 600 may be an electronic, magnetic, optical, or other physical storage device that contains or stores executable instructions. The computer readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to identify IP addresses and flow attributes associated with each of the IP addresses. The processor may fetch, decode, and execute the instructions 604 to train a machine learning model using the IP addresses as inputs to the machine learning model and connection contexts as outputs of the machine learning model. The machine learning model may learn first embedded vectors corresponding to the IP addresses and second embedded vectors corresponding to the flow attributes. According to examples, the flow attributes include concatenations of the flow attributes associated with a corresponding IP address. The processor may execute the instructions to learn the first embedded vectors and the second embedded vectors jointly.

According to examples, the first embedded vectors may form a first embedding matrix and the second embedded vectors may form a second embedding matrix. In examples, each row of the first embedding matrix may be one of the first embedded vectors corresponding to an IP address, and each column of the second embedding matrix may be one of the second embedding vectors corresponding to a flow attribute.

According to examples, the processor may determine a weighting factor for each of the flow attributes associated with the IP addresses. According to examples, the processor may apply the weighting factor during training of the machine learning model. In examples, the weighting factor for a particular flow attribute may vary proportionally to a frequency in which the particular flow attribute is associated with a particular IP address, and may vary inversely to a number of IP addresses in a network data log associated with the particular flow attribute. According to examples, the processor may change a number of training points for the flow attributes based on the weighting factor during training of the machine learning model.

According to examples, the processor may initialize the first embedding matrix in the machine learning model using the identified IP addresses.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium on which is stored instructions that when executed by the processor, are to cause the processor to:
identify Internet protocol (IP) addresses and connection attributes associated with the IP addresses; and
train a machine learning model using the IP addresses as inputs to the machine learning model and connection contexts as outputs of the machine learning model, the machine learning model learning a first weight matrix corresponding to the IP addresses and a second weight matrix corresponding to the connection contexts, wherein the connection contexts comprise concatenations of the connection attributes associated with a corresponding IP address.

2. The apparatus of claim 1, wherein the instructions further cause the processor to:
learn the first weight matrix and the second weight matrix jointly.

3. The apparatus of claim 1, wherein the first weight matrix comprises an embedding vector for each of the IP addresses that includes a plurality of first weights in an embedding space.

4. The apparatus of claim 3, wherein the second weight matrix comprises an embedding vector for each of the connection contexts that includes a plurality of second weights in the embedding space.

5. The apparatus of claim 4, wherein the instructions further cause the processor to:
determine an error in the machine learning model and change at least one of the plurality of first weights or the plurality of second weights based on the determined error.

6. The apparatus of claim 1, wherein the instructions further cause the processor to
identify embedded vectors for each of the IP addresses from the first weight matrix and each of the connection contexts from the second weight matrix; and
input the identified embedded vectors to a second machine learning model to determine anomalies in network traffic.

7. The apparatus of claim 1, wherein, during training of the machine learning model, each IP address input to the machine learning model is input as a one-hot vector having a length corresponding to a number of IP addresses identified and each connection context output from the machine learning model is output as a one-hot vector having a length corresponding to a number of connection contexts.

8. The apparatus of claim 1, wherein
each row of the first weight matrix is an embedding vector corresponding to the IP addresses, and
each column of the second weight matrix is an embedding vector corresponding to the connection contexts.

9. The apparatus of claim 1, wherein the instructions further cause the processor to:
determine a weighting factor for each of the connection contexts associated with the IP addresses, and apply the weighting factor during training of the machine learning model, wherein the weighting factor for a particular connection context varies proportionally to a frequency in which the particular connection context is associated with a particular IP address, and varies inversely to a number of IP addresses in a network data log associated with the particular connection context, or change a number of training points for the connection contexts based on the weighting factor during training of the machine learning model.

10. The apparatus of claim 1, wherein the instructions further cause the processor to:

initialize the first weight matrix in the machine learning model using the identified IP addresses.

11. The apparatus of claim 1, wherein the instructions further cause the processor to:

initialize the second weight matrix in the machine learning model using the connection contexts.

12. The apparatus of claim 1, wherein the connection attributes associated with a connection for each of the IP addresses include at least one of a source port, a destination IP address, a destination port, a protocol, a TCP flag, a timestamp, a number of bytes, or a number of packets.

13. A method comprising:

identifying, by a processor, Internet protocol (IP) addresses and connection attributes associated with the IP addresses; and training, by the processor, a machine learning model using the IP addresses as inputs to the machine learning model and the connection attributes as outputs of the machine learning model, the machine learning model learning a first embedding corresponding to the IP addresses and a second embedding corresponding to the connection attributes, wherein the connection attributes comprise concatenations of the connection attributes associated with a corresponding IP address, and wherein the first embedding for the IP addresses and the second embedding for the connection attributes are learned jointly.

14. The method of claim 13, further comprising determining a weighting factor for each of the connection attributes associated with the IP addresses, and applying the weighting factor during training of the machine learning model, wherein the weighting factor for a particular connection attribute varies proportionally to a frequency in which the particular connection attribute is associated with a particular IP address, and varies inversely to a number of IP addresses in a network data log associated with the particular connection attribute, or changing a number of training points for the connection attributes based on the weighting factor during training of the machine learning model.

15. The method of claim 13, wherein training the machine learning model comprises:

initializing a first weight matrix of the first embedding using the identified IP addresses and initializing a second weight matrix of the second embedding using the connection attributes.

16. A non-transitory computer readable medium having computer readable instructions that, when executed by a processor, cause the processor to:

identify Internet protocol (IP) addresses and flow attributes associated with each of the IP addresses; and train a machine learning model using the IP addresses as inputs to the machine learning model and connection contexts as outputs of the machine learning model, the machine learning model learning first embedded vectors corresponding to the IP addresses and second embedded vectors corresponding to the flow attributes, wherein the flow attributes comprise concatenations of the flow attributes associated with a corresponding IP address.

17. The non-transitory computer readable medium of claim 16, wherein the instructions further cause the processor to:

learn the first embedded vectors and the second embedded vectors jointly.

18. The non-transitory computer readable medium of claim 16, wherein the first embedded vectors form a first embedding matrix and the second embedded vectors form a second embedding matrix, wherein each row of the first embedding matrix is one of the first embedded vectors corresponding to an IP address, and each column of the second embedding matrix is one of the second embedding vectors corresponding to a flow attribute.

19. The non-transitory computer readable medium of claim 16, wherein the instructions further cause the processor to:

determine a weighting factor for each of the flow attributes associated with the IP addresses, and apply the weighting factor during training of the machine learning model, wherein the weighting factor for a particular flow attribute varies proportionally to a frequency in which the particular flow attribute is associated with a particular IP address, and varies inversely to a number of IP addresses in a network data log associated with the particular flow attribute, or change a number of training points for the flow attributes based on the weighting factor during training of the machine learning model.

20. The non-transitory computer readable medium of claim 16, wherein the instructions further cause the processor to:

initialize a first embedding matrix in the machine learning model using the identified IP addresses.

* * * * *